US011827445B1

(12) United States Patent
Qian

(10) Patent No.: US 11,827,445 B1
(45) Date of Patent: Nov. 28, 2023

(54) SUPPORT MECHANISM AND TRANSPORT CONTAINER USING SUPPORT MECHANISM

(71) Applicant: SUZHOU HEXIN NEW MATERIAL CO., LTD., Jiangsu (CN)

(72) Inventor: Xiaoren Qian, Jiangsu (CN)

(73) Assignee: SUZHOU HEXIN NEW MATERIAL CO., LTD., Jiangsu (CN)

( * ) Notice: Subject to any disclaimer, the term of this patent is extended or adjusted under 35 U.S.C. 154(b) by 0 days.

(21) Appl. No.: 18/127,716

(22) Filed: Mar. 29, 2023

Related U.S. Application Data

(63) Continuation of application No. PCT/CN2023/080954, filed on Mar. 11, 2023.

(30) Foreign Application Priority Data

Sep. 29, 2022 (CN) .......................... 202222601905.7

(51) Int. Cl.
*B60P 7/08* (2006.01)
*B65D 85/672* (2006.01)
*B60P 3/035* (2006.01)
*B60P 7/12* (2006.01)

(52) U.S. Cl.
CPC ............ *B65D 85/672* (2013.01); *B60P 3/035* (2013.01); *B60P 7/12* (2013.01); *B65D 2519/00711* (2013.01)

(58) Field of Classification Search
CPC .... B60P 3/035; B60P 3/40; B60P 7/12; B65D 19/44; B65D 2519/00711
USPC .......... 410/32–33, 35–36, 39–40, 42, 46–47, 410/49–50, 155; 206/303
See application file for complete search history.

(56) References Cited

U.S. PATENT DOCUMENTS

| 3,590,752 A * | 7/1971 | De Pew ................. B65D 19/44 206/443 |
| 4,199,070 A * | 4/1980 | Magnussen, Jr. ..... A47B 73/006 248/68.1 |
| 4,385,695 A * | 5/1983 | Champlin .............. B65D 61/00 206/443 |

(Continued)

FOREIGN PATENT DOCUMENTS

| CN | 204384095 U | 6/2015 |
| CN | 208602922 U | 3/2019 |

(Continued)

OTHER PUBLICATIONS

International Search Report of corresponding Application No. PCT/CN2023/080954; dated Jun. 25, 2023; 5 Pgs.

*Primary Examiner* — Stephen T Gordon
(74) *Attorney, Agent, or Firm* — COOPER LEGAL GROUP, LLC

(57) ABSTRACT

Disclosed are a support mechanism and a transport container, the technical field of support and accommodation mechanism is involved, comprising at least one group of supporter, each group of the supporters comprises two opposite support plates, and two of the support plates belonging to a same group are configured to jointly form a placement opening for insertion of a mandrel, wherein a top wall of one of the support plates is provided with a positioning block, and a bottom wall of another corresponding one of the support plates is provided with a positioning slot for insertion of the positioning block.

7 Claims, 7 Drawing Sheets

(56) References Cited

U.S. PATENT DOCUMENTS

| | | | | | |
|---|---|---|---|---|---|
| 5,060,810 | A | * | 10/1991 | Jones | A47F 7/0035 |
| | | | | | 248/68.1 |
| 6,592,309 | B1 | * | 7/2003 | Baughey | B60P 7/12 |
| | | | | | 410/42 |
| 8,388,285 | B2 | * | 3/2013 | Langh | B60P 7/15 |
| | | | | | 410/32 |
| 8,807,492 | B2 | * | 8/2014 | Lake | F16L 1/0246 |
| | | | | | 248/65 |
| 2011/0318131 | A1 | * | 12/2011 | Quick | B65D 71/0096 |
| | | | | | 410/47 |
| 2012/0093608 | A1 | * | 4/2012 | Kovacs, Jr. | F16L 3/2235 |
| | | | | | 410/47 |

FOREIGN PATENT DOCUMENTS

| | | |
|---|---|---|
| CN | 213893652 U | 8/2021 |
| CN | 218229934 U | 1/2023 |
| JP | H09286440 A | 11/1997 |
| JP | H1149152 A | 2/1999 |
| JP | H11124143 A | 5/1999 |
| JP | 2001219938 A | 8/2001 |
| JP | 2014091565 A | 5/2014 |

\* cited by examiner

SUPPORT MECHANISM AND TRANSPORT CONTAINER USING SUPPORT MECHANISM

CROSS-REFERENCE TO RELATED APPLICATIONS

This application is a continuation of PCT application serial no. PCT/CN2023/080954, filed on Mar. 11, 2023, which claims the priority and benefit of Chinese patent application serial no. 202222601905.7, filed on Sep. 29, 2022. The entireties of PCT application serial no. PCT/CN2023/080954 and Chinese patent application serial no. 202222601905.7 are hereby incorporated by reference herein and made a part of this specification.

TECHNICAL FIELD

This application relates to a technical field of support and accommodation mechanism, and, in particular, to a support mechanism and a transport container using support mechanism.

BACKGROUND

A mandrel is suitable for winding and accommodating film, paper, fabric etc. After winding and accommodating a product, the mandrel is supported by a support mechanism to reduce possibility of squeezing and in turn deformation of the product accommodated by the mandrel.

In the related technology, a support mechanism for supporting mandrel is provided. Referring to FIG. 1, the support mechanism includes two groups of supporters 1, each group of supporters 1 includes two opposite support plates 11 respectively, and two support plates 11 belonging to a same group are configured to jointly form a placement opening 113 for insertion of a mandrel 7. When the mandrel 7 must be packaged for transport, one of the support plates 11 of the two groups of supporters 1 is firstly placed on the ground, and then an end of the mandrel 7 is placed at the inner wall of the placement opening 113, and then the two support plates 11 of each group of supporters 1 are spliced together, so as to support and accommodate the mandrel 7.

For the above-mentioned related technology, the inventor believes during transport, when the support plates that are spliced together are collided due to external forces, the two support plates are prone to slippage relative to each other and even separation from each other, which in turn affects the engagement, supporting and accommodating stability of the mandrel by the support mechanism.

SUMMARY

A support mechanism and a transport container using support mechanism are disclosed, in order to improve the engagement, supporting and accommodating stability of the mandrel by the support mechanism.

In the first aspect, a support mechanism is provided, which includes at least one group of supporters. Each group of the supporters comprises two opposite support plates, and two support plates belonging to a same group are configured to jointly form a placement opening for insertion of a mandrel. A top wall of one of the support plates is provided with a positioning block, and a bottom wall of another corresponding one of the support plates is provided with a positioning slot for insertion of the positioning block.

By the above technical solution, the positioning block is inserted in the inner wall of the positioning slot, the two support plates belonging to a same group abut against each other, and the mandrel is inserted in the inner wall of the placement opening jointly formed between the two support plates, which effectively improves stability of the two support plates that abut against each other in horizontal direction. Thereby possibility of relative slippage or separation between the abutted two support plates is reduced when the support mechanism is collided by external force, thereby improving the engagement, supporting and accommodating stability of the mandrel by the support mechanism.

Preferably, the positioning block includes at least two first positioning blocks, the first positioning blocks each are provided with a flush plane, which is flush with a side wall of the corresponding support plate, and at least two first positioning blocks are configured to be symmetrical about the mandrel as a center.

By the above technical solution, at least two first positioning blocks are configured to be symmetrical about the mandrel as a center, and the two first positioning blocks each are provided with a flush plane, which is flush with a side wall of the corresponding support plate, thereby improving the stability of the first positioning block being inserted in the inner wall of the positioning slot, thus improving the stability of the two abutted support plates in horizontal direction.

Preferably, the positioning block includes a second positioning block, each perimeter wall of the second positioning block is not flush with a side wall of the support plates.

In the above technical solution, when each perimeter wall of the second positioning block is not flush with a side wall of the support plates, the second positioning block is stably inserted in the inner wall of the positioning slot, thus improving the stability of the two abutted support plates in horizontal direction.

Preferably, the positioning block comprises a third positioning block and a fourth positioning block, wherein the third positioning block is provided with a flush plane, which is flush with a side wall of the corresponding support plate, and each perimeter wall of the fourth positioning block is not flush with a side wall of the support plates.

In the above technical solution, the third positioning block is provided with a flush plane, which is flush with a side wall of the corresponding support plate, and each perimeter wall of the fourth positioning block is not flush with a side wall of the support plates, which efficiently improves the stability of the third positioning block in the inner wall of positioning slot by the fourth positioning block, thus improving the stability of the two abutted support plates in horizontal direction.

Preferably, an inner wall of the placement opening is provided with a cushion.

In the above technical solution, the cushion is provided, such that the friction force between the mandrel and the inner wall of the placement opening is increased, thus improving the stability of the mandrel being inserted in the inner wall of the placement opening and in turn prolonging the lift of the mandrel.

Preferably, the cushion is detachably connected with the inner wall of the placement opening.

By the above technical solution, when the size of the mandrel changes, the thickness of the cushion itself can be changed to accommodate different sizes of mandrels, thus effectively expanding the application range of the support mechanism for the mandrel.

Preferably, the positioning block is configured as an inclined block, and the positioning slot is configured as an inclined slot for adaptive insertion of the inclined block.

By the above technical solution, when the inclined positioning block is inserted in the inner wall of the inclined positioning slot, the two support plates approach each other along the movement trajectory of the positioning block, until the two support plates abut against each other, thus improving the stability of the two abutted support plates both in vertical direction and in horizontal direction.

Preferably, the positioning block is configured as an arc-shaped block, and the positioning slot is configured as an arc-shaped slot for adaptive insertion of the arc-shaped block.

By the above technical solution, when the arc-shaped positioning block is obliquely inserted in the inner wall of the arc-shaped positioning slot, the two support plates approach each other along the movement trajectory of the positioning block, until the two support plates abut against each other, thus improving the stability of the two support plates both in vertical direction and in horizontal direction.

In another aspect, a transport container using support mechanism is disclosed, which includes a bottom plate, a cover plate, a fastener configured to fasten the bottom plate and the cover plate, and the support mechanism described above, wherein the cover plate abuts against the bottom plate, and the support mechanism is arranged in a placement room enclosed by the cover plate and the bottom plate.

By the above technical solution, one support plate of each group of supporters is placed on the bottom plate, then the mandrel is inserted in the inner wall of the placement opening, then the other support plate of each group of supporters is arranged to abut against the corresponding support plate. At the moment, the support mechanism is located in a placement room enclosed by the cover plate and the bottom plate, and finally the cover plate and the bottom plate are fastened by the fastener, such that the support mechanism is protected by the transport container, thereby improving the engagement, supporting and accommodating stability of the mandrel by the support mechanism.

Preferably, the fastener is a rope and/or a nylon buckle.

By the above technical solution, the fastener is a rope and/or a nylon buckle, which effectively improves the selection range of the fastener for the staff, thus improving the convenience for the staff to fasten the cover plate and the bottom plate.

To sum up, at least one of the following beneficial technical effects can be realized:

1. when the positioning block is inserted in the inner wall of the positioning slot, two support plates belonging to a same group abut against each other, and the mandrel is inserted in the inner wall of the placement opening jointly formed between the two support plates, which effectively improves stability of the two support plates that abut against each other in horizontal direction. Thereby possibility of relative slippage or separation between the abutted two support plates is reduced when the support mechanism is collided by external force, thereby improving the engagement, supporting and accommodating stability of the mandrel by the support mechanism.

2. The cushion is provided, such that the friction force between the mandrel and the inner wall of the placement opening is increased, thus improving the stability of the mandrel being inserted in the inner wall of the placement opening and in turn prolonging the lift of the mandrel.

DESCRIPTION OF THE EMBODIMENTS

The present disclosure will be further described in detail in combination with the FIGS. 2-7.

Embodiment One

Figure 1:
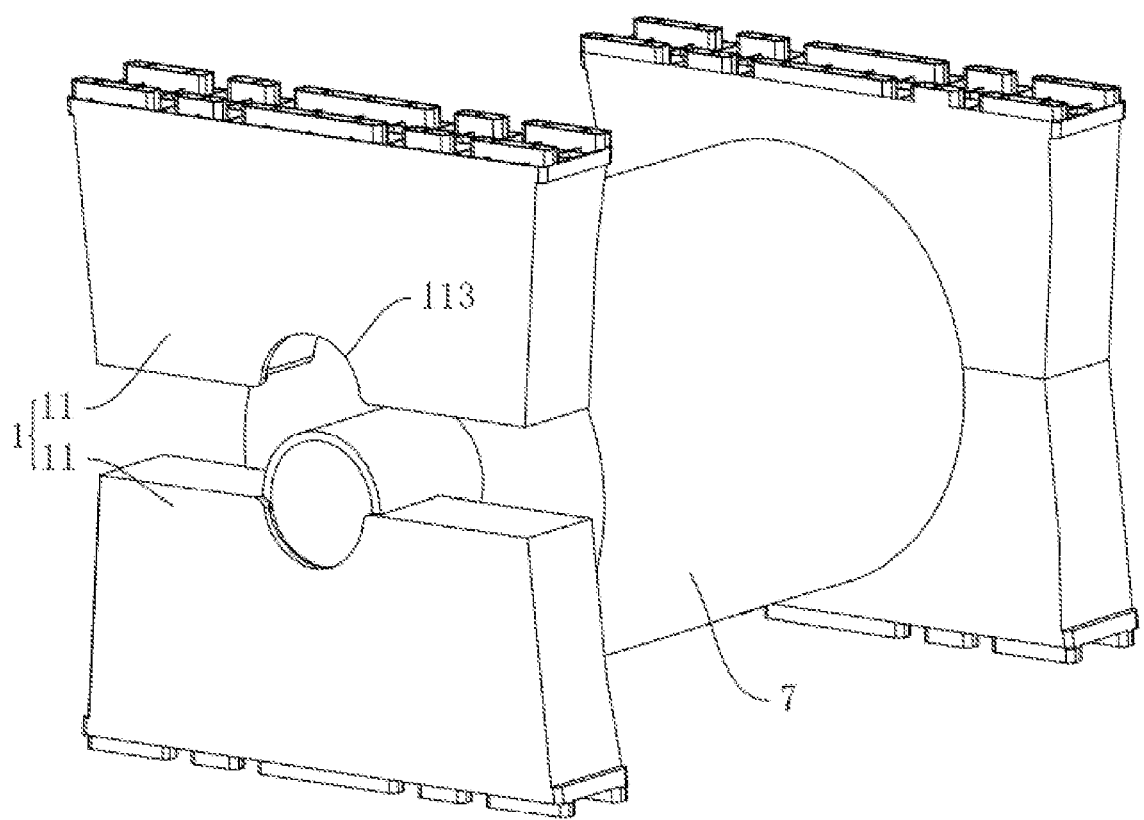
FIG. 1 is a diagram of an overall structure of a support mechanism for supporting a mandrel in related technology.
Figure 2:
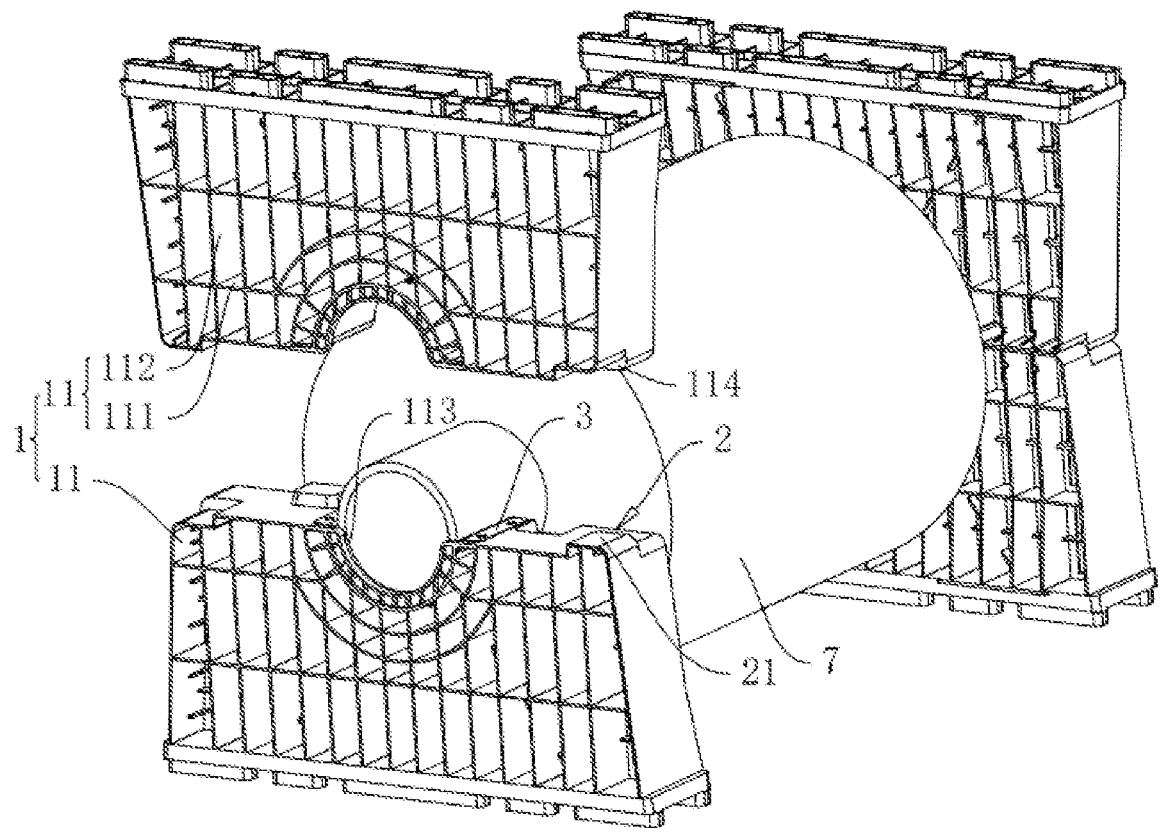
FIG. 2 is an exploded view of a support mechanism in embodiment one of the present disclosure.

A support mechanism is provided. Referring to FIG. 2, the support mechanism includes at least one group of supporters 1. Two groups of supporters 1 are provided in the present embodiment. Each group of the supporters 1 comprises two opposite support plates 11. The support plate 11 is spliced together by transverse ribbed plates 111 and vertical ribbed plates 112. Two support plates 11 are configured to jointly form a placement opening 113 for insertion of a mandrel 7. The inner wall of the placement opening 113 is detachably connected with a cushion 3 through a magnet or a nylon buckle. The cushion 3 can be made of rubber, which can effectively increase the friction force between the mandrel 7 and the inner wall of the placement opening 113, thus improving the stability of the mandrel 7 being inserted in the inner wall of the placement opening 113.

Referring to FIG. 2, a top wall of the support plate 11 is welded with a positioning block 2, and a bottom wall of the other support plate 11 is provided with a positioning slot 114 for insertion of the positioning block 2. The positioning block 2 includes at least two first positioning blocks 21, and the cross section thereof is square-shaped. In the present embodiment, each support plate 11 is provided with two first positioning blocks 21, wherein each of the first positioning blocks 21 is provided with a flush plane, which is flush with a side wall of the support plate 11. The two first positioning blocks 21 are arranged symmetrically about the mandrel 7 as center. When the two support plates 11 of each group of supporters 1 abut against each other, the first positioning block 21 is inserted in the inner wall of the positioning slot 114 vertically, such that possibility of relative slippage or separation between the abutted two support plates 11 is reduced, thereby improving the engagement, supporting and accommodating stability of the mandrel 7 by the support mechanism.

The implementation principle of a support mechanism of Embodiment one is: one support plate 11 of the two groups of supporters 1 is placed on the ground, and then the two ends of the mandrel 7 are placed at the inner wall of the corresponding placement opening 113, and finally the other support plate 11 of the two groups of supporters 1 is arranged to abut against the corresponding support plate 11. At the moment, the first positioning block 21 is inserted in the inner wall of the positioning slot 114, thus improving the stability of the two abutted support plates 11 in horizontal direction, which in turn improves the engagement, supporting and accommodating stability of the mandrel 7 by the support mechanism.

Embodiment Two

Figure 3:
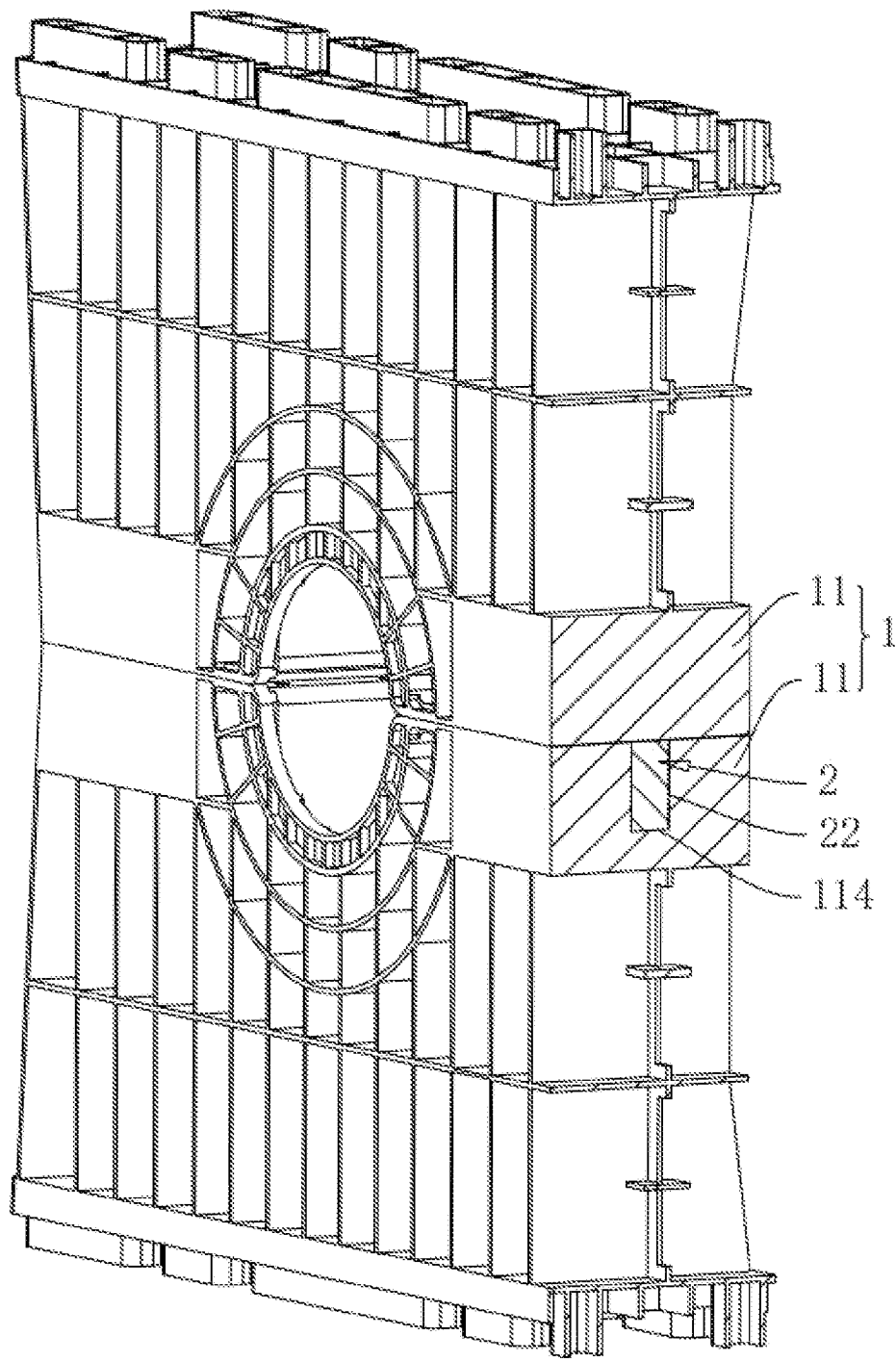
FIG. 3 is a section view of a support mechanism in embodiment two of the present disclosure.

Embodiment two is distinguishable from Embodiment one as follows: Referring to FIG. 3, the positioning block 2 includes a second positioning block 22, the cross section thereof is square-shaped. Each perimeter wall of the second positioning block 22 is not flush with a side wall of the corresponding support plate 11. When the two support plates 11 of each group of supporters 1 abut against each other, the second positioning block 22 is inserted in the inner wall of the positioning slot 114 vertically, such that possibility of relative slippage or separation between the abutted two support plates 11 is reduced, thereby improving the engagement, supporting and accommodating stability of the mandrel 7 by the support mechanism.

The implementation principle of a support mechanism of Embodiment two is: one support plate 11 of the two groups of supporters 1 is placed on the ground, and then the two ends of the mandrel 7 are placed at the inner wall of the corresponding placement opening 113, and finally the other support plate 11 of the two groups of supporters 1 is arranged to abut against the corresponding support plate 11. At the moment, the second positioning block 22 is inserted in the inner wall of the positioning slot 114, thus improving the stability of the two abutted support plates 11 in horizontal direction, which in turn improves the engagement, supporting and accommodating stability of the mandrel 7 by the support mechanism.

Embodiment Three

Figure 4:
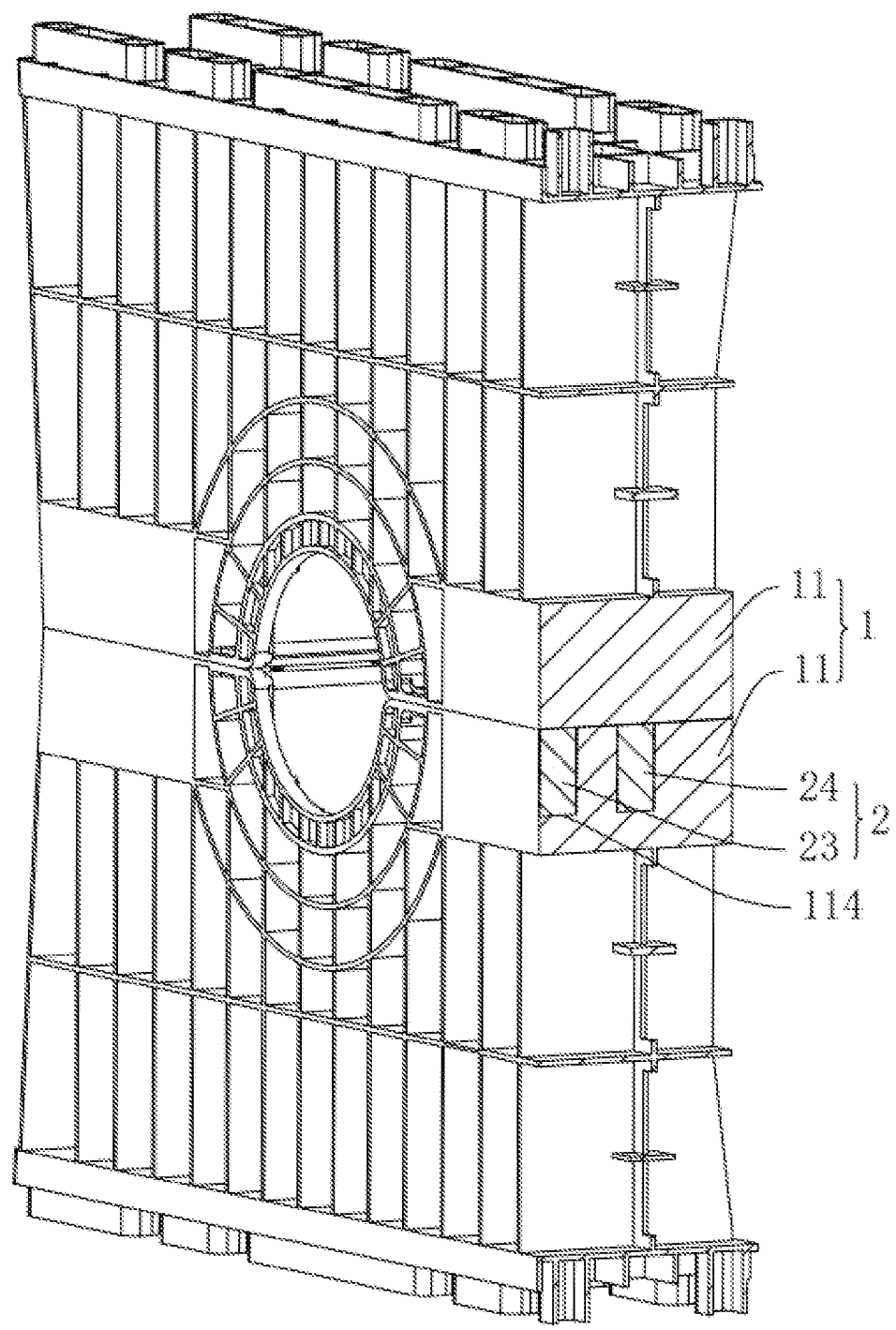
FIG. 4 is a section view of a support mechanism in embodiment three of the present disclosure.

Embodiment three is distinguishable from Embodiment one as follows: Referring to FIG. 4, the positioning block 2 includes a third positioning block 23 and a fourth positioning block 24, the cross section of both the third positioning block 23 and the fourth positioning block 24 is square-shaped. The third positioning blocks 23 is provided with a flush plane, which is flush with a side wall of the corresponding support plate 11, and each perimeter wall of the fourth positioning block 24 is not flush with a side wall of the support plates 11. When the two support plates 11 of each group of supporters 1 abut against each other, the third positioning block 23 and the fourth positioning block 24 are inserted in the inner walls of the corresponding positioning slots 114 vertically, such that possibility of relative slippage or separation between the abutted two support plates 11 is reduced, thereby improving the engagement, supporting and accommodating stability of the mandrel 7 by the support mechanism.

The implementation principle of a support mechanism of Embodiment three is: one support plate 11 of the two groups of supporters 1 is placed on the ground, and then the two ends of the mandrel 7 are placed at the inner wall of the corresponding placement opening 113, and finally the other support plate 11 of the two groups of supporters 1 is arranged to abut against the corresponding support plate 11. At the moment, the third positioning block 23 and the fourth positioning block 24 are inserted in the inner walls of the corresponding positioning slots 114, thus improving the stability of the two abutted support plates 11 in horizontal direction, which in turn improves the engagement, supporting and accommodating stability of the mandrel 7 by the support mechanism.

Embodiment Four

Figure 5:
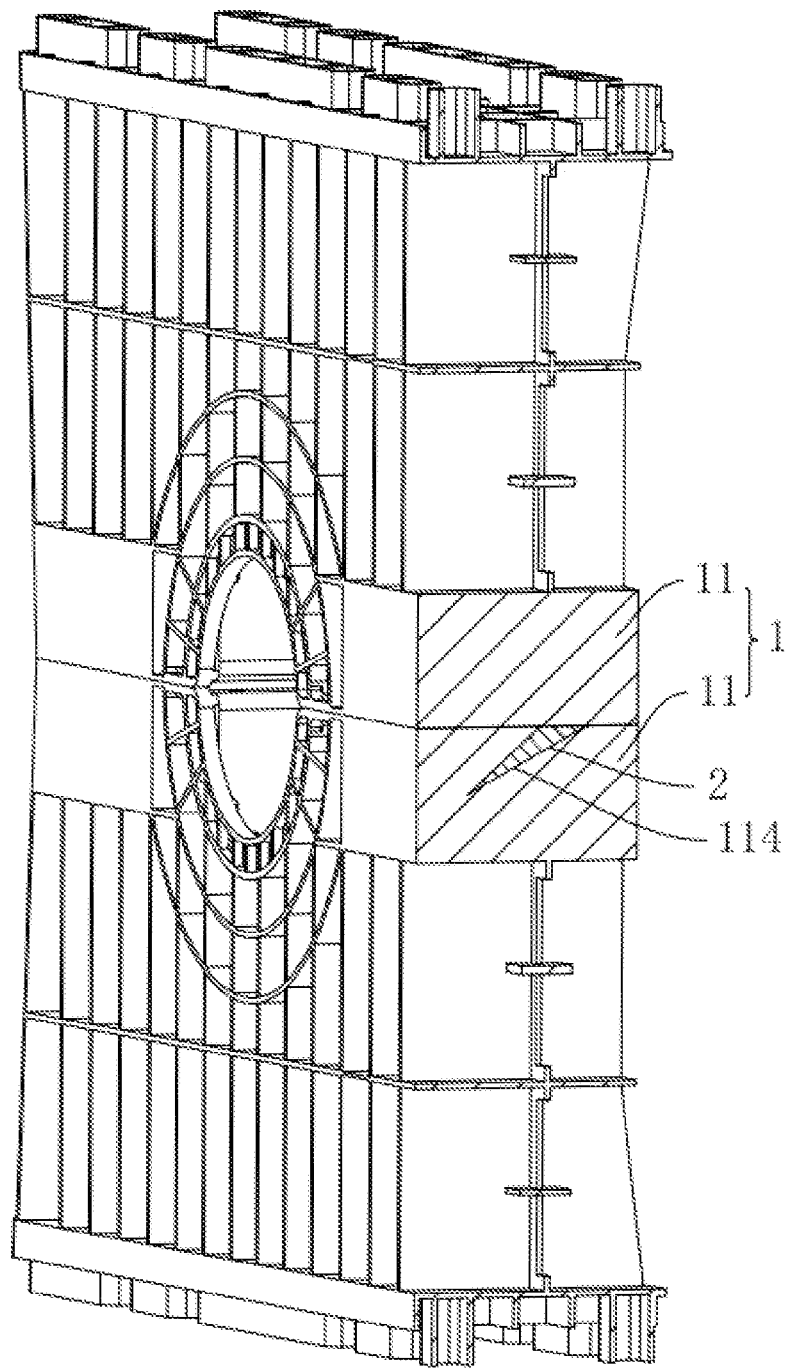
FIG. 5 is section view of a support mechanism in embodiment four of the present disclosure.

Embodiment four is distinguishable from Embodiment one as follows: Referring to FIG. 5, the positioning block 2 is configured as an inclined block, and an inner wall of the positioning slot 114 is configured as an inclined slot for adaptive insertion of the inclined block, wherein the cross-section of the positioning block 2 is configured as an obtuse triangle. When the end of the positioning block 2 is slidably connected with the inner wall of the positioning slot 114 in the inclined direction of the inner wall of the positioning slot 114, the two support plates 11 of each group of supporters 1 synchronously approach each other along the movement trajectory of the positioning block 2. When the positioning block 2 is completely inserted in the inner wall of the positioning slot 114, the two support plates 11 overlap and abut against each other, thus improving the stability of the two support plates 11 in vertical and horizontal directions, which overlap and abut against each other.

The implementation principle of a support mechanism of Embodiment four is: one support plate 11 of the two groups of supporters 1 is placed on the ground, and then the two ends of the mandrel 7 are placed at the inner wall of the corresponding placement opening 113, and finally the other support plate 11 of the two groups of supporters 1 is arranged to approach the one support plate in the inclined direction, in which the positioning block 2 is inserted in the inner wall of the positioning slot 114. The two support plates 11 overlap and abut against each other, thus improving the stability of these two support plates 11 in vertical and horizontal directions, which in turn improves the engagement, supporting and accommodating stability of the mandrel 7 by the support mechanism.

Embodiment Five

Figure 6:
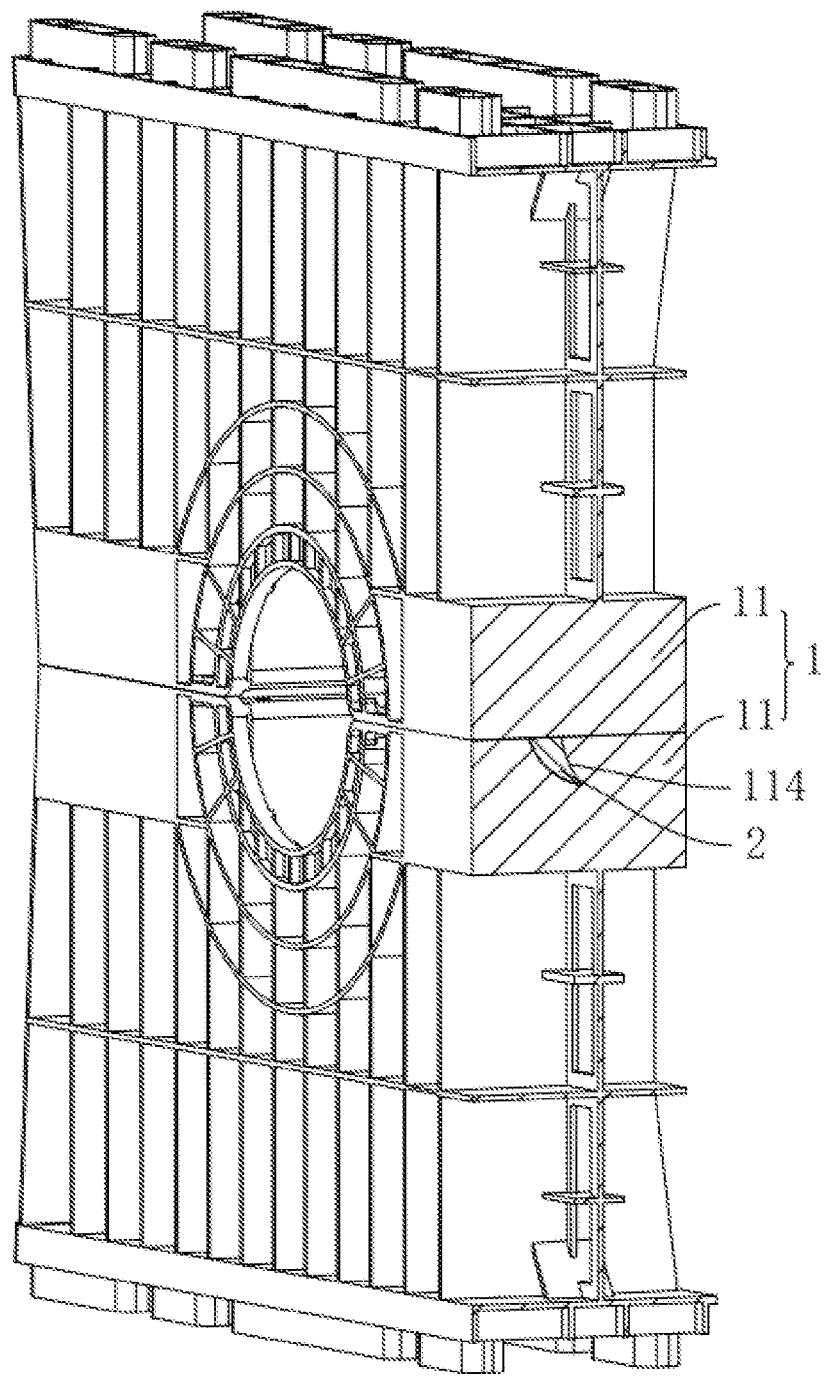
FIG. 6 is a section view of a support mechanism in embodiment five of the present disclosure.

Embodiment five is distinguishable from Embodiment one is as follows: Referring to FIG. 6, the positioning block 2 is configured as an arc-shaped block, and an inner wall of the positioning slot 114 is configured as an arc-shaped slot for adaptive insertion of the arc-shaped block. When the end of the positioning block 2 is slidably connected with the inner wall of the positioning slot 114 in the arc-shaped direction of the inner wall of the positioning slot 114, the two support plates 11 of each group of supporters 1 synchronously approach each other along the movement trajectory of the positioning block 2. When the positioning block 2 is completely inserted in the inner wall of the positioning slot 114, the two support plates 11 overlap and abut against each other, thus improving the stability of the two support plates 11 in vertical and horizontal directions, which overlap and abut against each other.

The implementation principle of a support mechanism of Embodiment five is: one support plate 11 of the two groups of supporters 1 is placed on the ground, and then the two ends of the mandrel 7 are placed at the inner wall of the corresponding placement opening 113, and finally the other support plate 11 of the two groups of supporters 1 is arranged to approach the one support plate in the arc-shaped direction, in which the positioning block 2 is inserted in the inner wall of the positioning slot 114. The two support plates 11 overlap and abut against each other, thus improving the stability of these two support plates 11 in vertical and horizontal directions, which in turn improves the engagement, supporting and accommodating stability of the mandrel 7 by the support mechanism.

Embodiment 6

Figure 7:
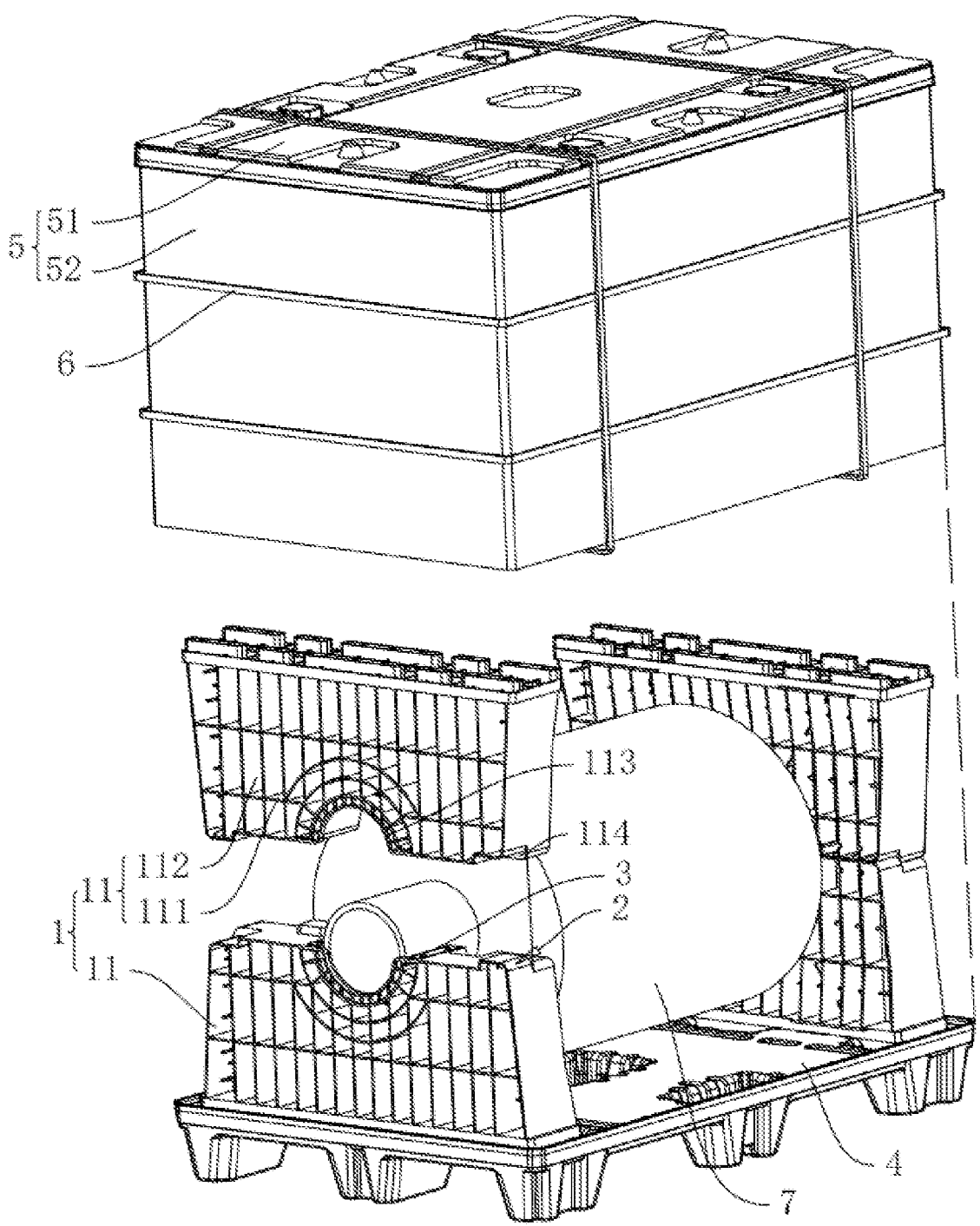
FIG. 7 is an exploded view of a transport container in embodiment six of the present disclosure.

A transport container is provided. Referring to FIG. 7, the transport container includes a bottom plate 4, a cover plate 5, a fastener 6, and the support mechanism according to one of embodiments 1 to 5, wherein the support mechanism in the transport container of the present embodiment is the support mechanism in embodiment one.

Referring to FIG. 7, the cover plate 5 includes a top plate 51 and a cover frame 52, wherein the top plate 51 and the cover frame 52 are integrally formed. The cover plate 5 abuts against the upper surface of the bottom plate 4, and the support mechanism is arranged in a placement room enclosed by the cover plate 5 and the bottom plate 4. The fastener 6 is configured to fasten the bottom plate 4 and the cover plate 5. The fastener 6 is a rope or a nylon buckle or a combination thereof. When the rope is used to fasten the cover plate 5 and the bottom plate 4, at least two ropes are provided. The two ropes are wound along the length direction and width direction of the cover plate 5 and the bottom plate 4 and knotted respectively. When the nylon buckle is used to fasten the cover plate 5 and the bottom plate 4, at least two nylon buckles are provided, each of which includes a nylon strap and a nylon hook strap. The two nylon buckles are wound along the length direction and width direction of the cover plate 5 and the bottom plate 4 respectively, until the corresponding nylon strap abuts against the corresponding nylon hook strap. When a combination of the rope and the nylon buckle is used to fasten the cover plate 5 and the bottom plate 4, two ropes and two nylon buckles are provided and correspond one by one. Each nylon buckle includes a nylon strap and a nylon hook strap, which are disposed on the two ends of the rope by glue. The combination of the two nylon buckles and ropes are wound along the length direction and width direction of the cover plate 5 and the bottom plate 4 respectively, until the nylon strap and the corresponding nylon hook strap at two ends of each rope abut against each other.

In Embodiment six, the fastener 6 is configured as a rope. After the support mechanism is arranged in a placement room enclosed by the cover plate 5 and the bottom plate 4, the bottom plate 4 and the cover plate 5 is fastened through the fastener 6, such that the support mechanism is protected by the transport container, thereby improving the engagement, supporting and accommodating stability of the mandrel 7 by the support mechanism.

The implementation principle of a transport container of Embodiment six is: one support plate 11 of the two groups of supporters 1 is placed on the bottom plate 4, then the two ends of the mandrel 7 are placed at the inner wall of the corresponding placement opening 113, then the other support plate 11 of the two groups of supporters 1 is arranged to abut against the corresponding support plate 11. Subsequently, the cover plate 5 is placed on the bottom plate 4, and finally the cover plate 5 and the bottom plate 4 are fastened by the fastener 6, such that the support mechanism is protected by the transport container, thereby improving the engagement, supporting and accommodating stability of the mandrel 7 by the support mechanism.

The above are the preferred embodiments of this application, which are not to limit the protection scope of this application. Therefore, all equivalent changes made according to the structure, shape and principle of this application should be covered by the protection scope of this application.

What is claimed is:

1. A support mechanism, comprising at least one group of supporters, each group of the supporters comprises two opposite support plates, and two of the support plates belonging to a same group are configured to jointly form a placement opening for insertion of a mandrel, wherein a top wall of one of the support plates is provided with a positioning block, and a bottom wall of another corresponding one of the support plates is provided with a positioning slot for insertion of the positioning block, wherein the positioning block comprises a first positioning block and a second positioning block, the first positioning block is provided with a flush plane being flush with a side wall of a corresponding one of the support plates, and each perimeter wall of the second positioning block is not flush with a side wall of the support plates.

2. The support mechanism according to claim 1, wherein an inner wall of the placement opening is provided with a cushion.

3. The support mechanism according to claim 2, wherein the cushion is detachably connected with the inner wall of the placement opening.

4. The support mechanism according to claim 1, wherein the positioning block is configured as an inclined block, and the positioning slot is configured as an inclined slot for adaptive insertion of the inclined block.

5. The support mechanism according to claim 1, wherein the positioning block is configured as an arc-shaped block, and the positioning slot is configured as an arc-shaped slot for adaptive insertion of the arc-shaped block.

6. A transport container, comprising:
a bottom plate,
a cover plate,
a fastener configured to fasten the bottom plate and the cover plate, and
a support mechanism, comprising at least one group of supporters, each group of the supporters comprises two opposite support plates, and two of the support plates belonging to a same group are configured to jointly form a placement opening for insertion of a mandrel, wherein a top wall of one of the support plates is provided with a positioning block, and a bottom wall of another corresponding one of the support plates is provided with a positioning slot for insertion of the positioning block,
wherein the cover plate abuts against the bottom plate, and the support mechanism is arranged in a placement room enclosed by the cover plate and the bottom plate.

7. The transport container according to claim 6, wherein the fastener is at least one of a rope or a nylon buckle.

* * * * *